US011355120B1

(12) United States Patent
Talib et al.

(10) Patent No.: US 11,355,120 B1
(45) Date of Patent: Jun. 7, 2022

(54) AUTOMATED ORDERING SYSTEM

(71) Applicant: ConverseNowAI, Austin, TX (US)

(72) Inventors: Zubair Talib, Irvine, CA (US); Rahul Aggarwal, Austin, TX (US); Vinay Kumar Shukla, Austin, TX (US); Pranav Nirmal Mehra, Bangalore (IN); Vrajesh Navinchandra Sejpal, Bangalore (IN); Akshay Labh Kayastha, Bangalore (IN); Yuganeshan A J, Bangalore (IN); German Kurt Grin, Buenos Aires (AR); Fernando Ezequiel Gonzalez, Caba (AR); Julia Milanese, Berlin (DE); Matias Grinberg, Caba (AR)

(73) Assignee: ConverseNowAI, Austin, TX (US)

( * ) Notice: Subject to any disclaimer, the term of this patent is extended or adjusted under 35 U.S.C. 154(b) by 0 days.

(21) Appl. No.: 17/491,536

(22) Filed: Oct. 1, 2021

Related U.S. Application Data

(63) Continuation of application No. 17/366,941, filed on Jul. 2, 2021, which is a continuation-in-part of application No. 17/184,207, filed on Feb. 24, 2021.

(51) Int. Cl.
| | | |
|---|---|---|
| *G10L 15/00* | (2013.01) |
| *G10L 15/22* | (2006.01) |
| *G10L 15/18* | (2013.01) |
| *G06Q 50/12* | (2012.01) |
| *G10L 15/26* | (2006.01) |
| *G06Q 30/06* | (2012.01) |

(52) U.S. Cl.
CPC .......... *G10L 15/22* (2013.01); *G06Q 30/0633* (2013.01); *G06Q 50/12* (2013.01); *G10L 15/1815* (2013.01); *G10L 15/26* (2013.01); *G10L 2015/225* (2013.01)

(58) Field of Classification Search
CPC .......... G06F 3/167; G10L 15/22; G10L 15/26
See application file for complete search history.

(56) References Cited

U.S. PATENT DOCUMENTS

| | | | | |
|---|---|---|---|---|
| 5,357,596 | A * | 10/1994 | Takebayashi | ............. G06F 3/16 704/251 |
| 5,625,749 | A | 4/1997 | Goldenthal et al. | |
| 6,330,539 | B1 * | 12/2001 | Takayama | ........... G10L 15/1822 704/275 |
| 7,110,963 | B2 * | 9/2006 | Negreiro | ................ G06K 17/00 704/275 |
| 9,129,289 | B2 | 9/2015 | Vaughn et al. | |
| 9,626,703 | B2 * | 4/2017 | Kennewick, Sr. | .. G10L 15/1815 |

(Continued)

*Primary Examiner* — Daniel Abebe
(74) *Attorney, Agent, or Firm* — Shiv S. Naimpally; Grable Martin Fulton PLLC

(57) ABSTRACT

In some examples, a software agent executing on a server receives a communication comprising a first utterance from a customer and predicts, using an intent classifier, a first intent of the first utterance. Based on determining that the first intent is order-related, the software agent predicts, using a dish classifier, a cart delta vector based at least in part on the first utterance and modifies a cart associated with the customer based on the cart delta vector. The software agent predicts, using a dialog model, a first dialog response based at least in part on the first utterance and provides the first dialog response to the customer using a text-to-speech converter.

20 Claims, 9 Drawing Sheets

(56) References Cited

U.S. PATENT DOCUMENTS

| | | |
|---|---|---|
| 10,055,685 B1 | 8/2018 | Arel et al. |
| 10,162,794 B1 | 12/2018 | Arel et al. |
| 10,210,861 B1 | 2/2019 | Arel et al. |
| 10,325,223 B1 | 6/2019 | Arel et al. |
| 10,559,299 B1 | 2/2020 | Arel et al. |
| 10,573,296 B1 | 2/2020 | Arel et al. |
| 10,628,635 B1 | 4/2020 | Carpenter et al. |
| 10,878,824 B2 | 12/2020 | Carpenter et al. |
| 11,023,955 B1 | 6/2021 | Carpenter et al. |
| 2002/0111881 A1 | 8/2002 | Walker et al. |
| 2003/0144846 A1 | 7/2003 | Denenberg et al. |
| 2006/0076397 A1* | 4/2006 | Langos ................ G06Q 10/087 235/375 |
| 2007/0040026 A1 | 2/2007 | Vleet et al. |
| 2011/0131038 A1 | 6/2011 | Oyaizu et al. |
| 2016/0078504 A1 | 3/2016 | Kennewick |
| 2017/0160813 A1 | 6/2017 | Divakaran et al. |
| 2018/0308100 A1 | 10/2018 | Haukioja et al. |
| 2019/0108566 A1 | 4/2019 | Coleman et al. |
| 2019/0251611 A1 | 8/2019 | Coleman et al. |
| 2019/0266561 A1* | 8/2019 | Koeppel ............ G06Q 10/0836 |
| 2019/0378533 A1 | 12/2019 | Chao |
| 2020/0034848 A1 | 1/2020 | Seo et al. |
| 2020/0160850 A1 | 5/2020 | Lin et al. |
| 2020/0226667 A1* | 7/2020 | Kalaimani ............... G06F 3/167 |
| 2020/0273089 A1 | 8/2020 | Siefken et al. |
| 2020/0279556 A1 | 9/2020 | Gruber et al. |
| 2020/0311804 A1* | 10/2020 | Buckholdt ............... G10L 15/26 |
| 2021/0158407 A1 | 5/2021 | Mimassi |

\* cited by examiner

AUTOMATED ORDERING SYSTEM

CROSS-REFERENCE TO RELATED APPLICATIONS

The present patent application is a continuation of U.S. patent application Ser. No. 17/366,941, filed Jul. 2, 2021, entitled, AUTOMATED ORDERING SYSTEM", which is a continuation-in-part of U.S. patent application Ser. No. 17/184,207, filed on Feb. 24, 2021, entitled "DETERMINING ORDER PREFERENCES AND ITEM SUGGESTIONS" all of which are incorporated by reference herein in their entirety and for all purposes as if completely and fully set forth herein.

BACKGROUND OF THE INVENTION

Field of the Invention

This invention relates generally to systems to order food and, more particularly to automated systems to order food.

Description of the Related Art

Restaurants are continually struggling to keep prices low to make items affordable and on par with competitor pricing. One of the major costs associated with a restaurant is labor. For example, one employee of the restaurant may take an order from a customer and one or more additional employees may prepare and package the food for eat-in, carry out, or delivery.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a software agent executing on a server receives a communication comprising a first utterance from a customer and predicts, using an intent classifier, a first intent of the first utterance. Based on determining that the first intent is order-related, the software agent predicts, using a dish classifier, a cart delta vector based at least in part on the first utterance and modifies a cart associated with the customer based on the cart delta vector. The software agent predicts, using a dialog model, a first dialog response based at least in part on the first utterance and provides the first dialog response to the customer using a text-to-speech converter.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
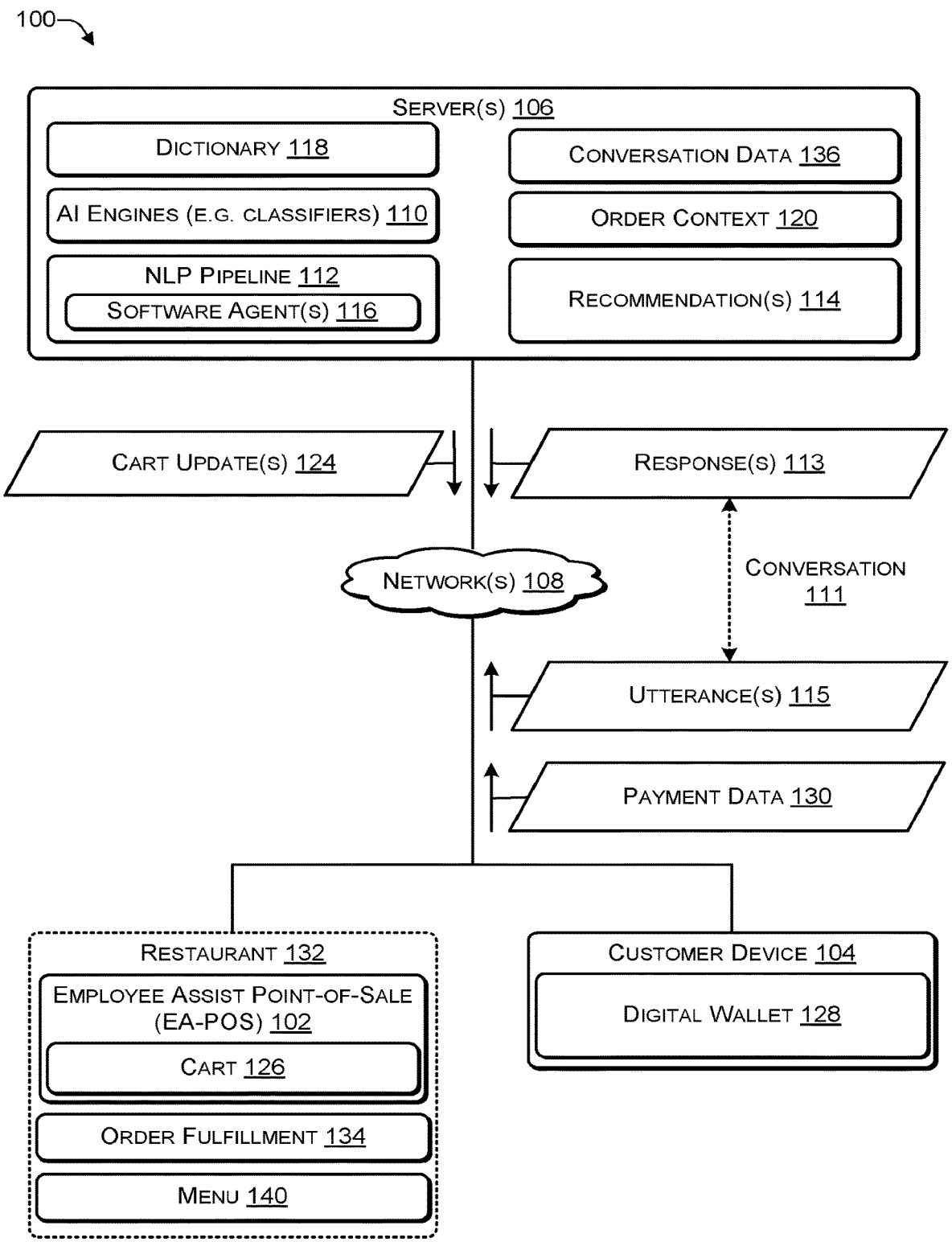
FIG. 1 is a block diagram of a system that includes a server to gather conversation data, according to some embodiments.

U.S. patent application Ser. No. 17/184,207 describes a system in which a machine learning algorithm (e.g., an artificial intelligence (AI) engine) monitors a conversation between a customer and an employee at a restaurant. As the system is monitoring the conversation, the system interacts with a point-of-sale (POS) terminal to add, subtract, modify, or any combination thereof the contents of a cart. For example, if the customer is placing an order for one or more food items, the system may automatically add contents to the cart based on the customer's voice input. To illustrate, if the customer says "Two large pepperoni pizzas" then the system automatically (e.g., without human interaction) adds two large pepperoni pizzas to the cart. Thus, the employee verbally interacts with the customer, without interacting with the point-of-sale terminal, and with the system interacting with the point-of-sale terminal. The employee observes the system modifying the contents of the cart while the employee is verbally interacting with the customer. The employee may interact with the point-of-sale terminal to make corrections if the system makes an error. The system may provide upsell suggestions to the employee to provide to the customer. The upsell suggestions may include increasing a size of an item ordered by the customer (e.g., "Would you like an extra-large instead of a large for just two dollars more?", adding an item (e.g., "Would you like to add something to drink?"), or both. The upsell suggestions may be provided to the employee via, for example, audibly (e.g., via an earpiece) or visually (e.g., displayed on the point-of-sale terminal). In addition, the system may be used to train new employees by prompting them as to what to say to the customer during a conversation to take an order.

The conversation data that includes the verbal interaction between the employee and the customer when the customer is placing an order is archived. The conversation data is used to train an AI engine to provide a software agent (e.g., sometimes referred to as a "chat bot"). By using a large quantity of conversation data between human employees and human customers to train the software agent, the software agent is able to mimic the way in which a human employee takes an order in such a way that the human customer may be unaware that they are interacting with a software agent rather than a human employee. The term human employee refers to any human employed on behalf of the commerce company to take orders, including employees (including contractors and the like) at a call center run by the commerce site or a 3rd party. In this way, a human employee is replaced by a software agent to take an order from a customer, thereby saving the restaurant money and increasing profit margins.

As a first example, a method performed by a server includes receiving, by a software agent (e.g., "chat bot") executing on the server, a communication comprising a first utterance from a customer. The utterance may be the customer's voice or customer input received via a website or a software application ("app"). For example, receiving, by the software agent executing on the server, the communication comprising the first utterance from the customer may include receiving audio data that includes the first utterance, converting the audio data to text using a speech-to-text converter, and performing post processing on the text to create a corrected utterance. The method may include predicting, using an intent classifier, a first intent of the first utterance. For example, the intent classifier may determine whether first intent is order-based or menu-based. Based on determining that the first intent is order-related, the method may include predicting, using a dish classifier, a cart delta vector based at least in part on the first utterance. The method includes modifying a cart associated with the customer based on the cart delta vector. Modifying the cart associated with the customer based on the cart delta vector may include: adding a new item to the cart, deleting a current item from the cart, modifying an existing item in the cart, or any combination thereof. The method includes predicting, using a dialog model, a first dialog response based at least in part on the first utterance, and providing the first dialog response, by the software agent, to the customer using a text-to-speech converter. For example, predicting, using the dialog model, the first dialog response based at least in part on the first utterance may include (i) predicting the first dialog response based on a plurality of candidate response, (ii) based on a dialog policy, and (iii) an order context. The order context may include (1) an interaction history between the customer and the software agent, (2) a cart state of the cart associated with the customer, and (3) a conversation state of a conversation between the customer and the software agent. The conversation may include the first utterance and the first dialog response. The method may include receiving, by the software agent, a second utterance from the customer, predicting, using the intent classifier, a second intent of the second utterance, and based on determining that the second intent is menu-related, retrieving menu-related information based at least in part on the second utterance. The method may include predicting, using the dialog model, a second dialog response based at least in part on the second utterance and the menu-related information and providing the second dialog response to the customer using the text-to-speech converter. The method may include receiving, by the software agent, a third utterance from the customer, predicting, using the intent classifier of the software agent, a third intent of the third utterance. Based on determining that the third intent is order-related, the method may include closing the cart. The method may include receiving payment information from the customer and initiating order fulfillment of items in the cart (e.g., preparing the items for takeout or delivery).

As a second example, a server includes one or more processors and one or more non-transitory computer readable media (e.g., a memory device) to store instructions executable by the one or more processors to perform various operations. The operations include receiving, by a software agent executing on the server, a communication comprising a first utterance from a customer. The operations include predicting, using an intent classifier, a first intent of the first utterance. Based on determining that the first intent is order-related, the operations include predicting, using a dish classifier, a cart delta vector based at least in part on the first utterance. The operations include modifying a cart associated with the customer based on the cart delta vector. For example, modifying the cart associated with the customer based on the cart delta vector may include adding a new item to the cart, deleting a current item from the cart, modifying an existing item in the cart, or any combination thereof. The new item, the current item, and the existing item correspond to menu items in a menu associated with a restaurant. The operations include predicting, using a dialog model, a first dialog response based at least in part on the first utterance. For example, predicting, using the dialog model, the first dialog response based at least in part on the first utterance may include predicting the first dialog response from a plurality of candidate responses based on a dialog policy and an order context. The order context may include an interaction history between the customer and the software agent, a cart state of the cart associated with the customer, and a conversation state of a conversation between the customer and the software agent. The conversation may include the first utterance and the first dialog response. The operations include providing the first dialog response, by the software agent, to the customer using a text-to-speech converter. The operations include receiving, by the software agent, a second utterance from the customer. The operations include predicting, using the intent classifier, a second intent of the second utterance. Based on determining that the second intent is menu-related, the operations include retrieving menu-related information based at least in part on the second utterance. The operations include predicting, using the dialog model, a second dialog response based at least in part on the second utterance and the menu-related information. The operations include providing the second dialog response to the customer using the text-to-speech converter. The operations include receiving, by the software agent, a third utterance from the customer. The operations include predicting, using the intent classifier of the software agent, a third intent of the third utterance. Based on determining that the third intent is order-related, the operations include closing the cart. The operations include receiving payment information from the customer. The operations include initiating order fulfillment of items in the cart.

As a third example, a non-transitory computer-readable storage medium, such as a memory device, may be used to store instructions executable by one or more processors to perform various operations. The operations include receiving, by a software agent executing on a server, a communication comprising a first utterance from a customer. The operations include predicting, using an intent classifier, a first intent of the first utterance. The operations include, based on determining that the first intent is order-related, predicting, using a dish classifier, a cart delta vector based at least in part on the first utterance. The operations include modifying a cart associated with the customer based on the cart delta vector. For example, modifying the cart associated with the customer based on the cart delta vector may include adding a new item to the cart; deleting a current item from the cart; modifying an existing item in the cart; or any combination thereof. The operations include predicting, using a dialog model, a first dialog response based at least in part on the first utterance. For example, predicting, using the dialog model, the first dialog response based at least in part on the first utterance may include predicting the first dialog response based on a plurality of candidate responses and based on a dialog policy and an order context. The order context may include (i) an interaction history between the customer and the software agent, (ii) a cart state of the cart associated with the customer, and (iii) a conversation state of a conversation between the customer and the software agent. The conversation may include the first utterance and the first dialog response. The operations include providing the first dialog response, by the software agent, to the customer using a text-to-speech converter. The operations may include receiving, by the software agent, a second utterance from the customer. The operations may include predicting, using the intent classifier, a second intent of the second utterance. The operations may include, based on determining that the second intent is menu-related, retrieving menu-related information based at least in part on the second utterance. The operations may include predicting, using the dialog model, a second dialog response based at least in part on the second utterance and the menu-related information. The operations may include providing the second dialog response to the customer using the text-to-speech converter. The operations may include receiving, by the software agent, a third utterance from the customer. The operations may include predicting, using the intent classifier of the software agent, a third intent of the third utterance. The operations may include, based on determining that the third intent is order-related, closing the cart. The operations may include receiving payment information from the customer. The operations may include initiating order fulfillment (e.g., takeout or delivery) of items in the cart.

FIG. 1 is a block diagram of a system 100 that includes a server to host software, according to some embodiments. The system 100 includes a representative employee-assistance point-of-sale (EA-POS) device 102, a consumer device 104, and one or more server(s) 106 connected to each other via one or more network(s) 108. The server 106 may include an AI engine 110 (e.g., a machine learning algorithm), a natural language processing (NLP) pipeline 112, and a software agent 116.

A customer may use the customer device 104 to initiate a call to a commerce site, such as a restaurant 132. A restaurant is used merely as an example and it should be understood that the systems and techniques described herein can be used for other types of commerce, such as ordering groceries, ordering non-perishable items and the like. In some cases, a human employee may receive the call and the AI engine 110 may monitor the conversation 111, including utterances 115 of the customer and responses 113. Initially, the responses 113 may be from a human employee of the restaurant 132. The AI engine 110 may determine which items from a menu 140 of the restaurant 132 the customer is ordering. The AI engine 110 may monitor the conversation 111 between the customer and the employee and automatically (e.g., without human interaction) modify a cart 126 hosted by the EA-POS device 102. In other cases, a human employee may receive the call, the AI engine 110 may monitor the conversation between the customer and the employee, and monitor what the employee enters into the EA-POS device 102. The employee entries may be used as labels when training the AI engine 110 and various machine learning (ML) models in the NLP pipeline 112. The AI engine 110 may use a dictionary 118 to identify words in the conversation. The AI engine 110 may keep a running track of an order context 120 associated with each particular order. The order context 120 may include order data associated with previously placed orders by each customer, trending items in a region in which the customer is located, specials/promotions (e.g., buy one get one free (BOGO), limited time specials, regional specials, and the like) that the restaurant 132 is currently promoting (e.g., on social media, television, and other advertising media), and other context-related information. The order context 120 may include user preferences, such as gluten allergy, vegan, vegetarian, or the like. The user may specify the preferences or the AI engines 110 may determine the preferences based on the customer's order history. For example, if the customer orders gluten-free products more than once, then the AI engines 110 may determine that the customer is gluten intolerant and add gluten intolerance to the customer's preference file. As another example, if the customer orders vegan or vegetarian items (or customizes menu items to be vegan or vegetarian) then the AI engines 110 may determine that the customer is vegan or vegetarian and add vegan or vegetarian to the customer's preference file. The cart 126 may include other information as how the order is to be fulfilled (e.g., pickup or delivery), customer address for delivery, customer contact information (e.g., email, phone number, etc.), and other customer information.

The customer may use a payment means, such as a digital wallet 128, to provide payment data 130 to complete the order. In response, the restaurant 132 may initiate order fulfillment 134 that includes preparing the ordered items for take-out, delivery, or in-restaurant consumption. Such conversations between human employees and customers may be stored as conversation data 136. The conversation data 136 is used to train a software agent 116 to take orders from customers in a manner similar to a human employee, such that the customers may be unaware that they are interacting with the software agent 116 rather than a human employee.

Subsequently (e.g., after the software agent 116 has been trained using the conversation data 136), when the customer uses a customer device 104 to initiate a communication to the restaurant 132 to place an order, the communication may be routed to the software agent 116. The customer may have a conversation 111 that includes utterances 115 of the customer and responses 113 by the software agent 116. In most cases, the conversation 111 does not include an employee of the restaurant. The conversation may be routed to a human being under particular exception conditions, such as due to an inability of the software agent 116 to complete the conversation 111 or the like.

The conversation 111 may include voice, text, touch input, or any combination thereof. For example, in some cases, the conversation 111 may include the voice of the customer and the responses 113 of the software agent 116 may be vocalized (e.g., converted into a synthesized voice) using text-to-speech technology. The conversation 111 may include text input and/or touch input in which the customer enters order information using a website, an application ("app"), a kiosk, or the like. One or more of the utterances 115 may result in the server 106 sending a cart update 124 to update a cart 126 at the point-of-sale device 102. The AI engine 110 may determine (e.g., predict) recommendations 114 that the software agent 116 provides in the responses 113 as part of the conversation 111. For example, the recommendations 114 may be based on items that the customer has previously ordered, items that are currently popular in the customer's region (e.g., zip code, city, county, state, country, or the like), and the like. To determine items that the customer previously ordered, the AI engine 110 may determine an identity of the customer based on, for example, an identifier (e.g., a phone number, an Internet protocol (IP) address, caller identifier, or the like) associated with the customer device 104, voice recognition, facial recognition (e.g., in the case of a video call), or another identifying characteristic associated with the call initiated by the customer device 104.

After the customer has completed an order, the customer may provide payment data 130, for example using an account (e.g., bank account, credit card account, debit card account, gift card account, or the like) stored in a digital wallet 128. The payment data 130 may be sent to the point-of-sale device 102 to complete a checkout process for the cart 126. After the payment data 130 has been received and the payment data processed, the restaurant 132 may initiate order fulfillment 134, such as preparing the items in the order for take-out, delivery, in-restaurant dining, or the like.

Thus, the system 100 includes an automated ordering system to enable customers to initiate and complete an order using voice, written text, or commands entered via a user interface (UI) provided by a website, an application ("app") or the like. The system 100 is configured to enable the interactions between human customers and software agents 116 to be natural and human-like to such a degree that the human customers may conclude that they interacted with a human rather than a software agent. Thus, in so far as ordering food from a restaurant is concerned, the software agents 116 may pass the Turing test. The software agents 116 engage in human-like conversations in which the software agents 116 exhibit flexibility in the dialog. The software agents 116 are trained, based on the conversation data, to have an understanding of complex natural language utterances that take into account the nuances of oral and written communications, including both formal communications and informal communications. The term 'utterance' may include anything spoken or typed by a customer, including a word, a phrase, a sentence, or multiple sentences (including incomplete sentences that can be understood based on the context).

The system 100 includes a voice ordering system that takes the utterances 115 of a customer and processes the utterances 115 through the Natural Language Processing (NLP) pipeline 112 (also referred to as a Natural Language Understanding (NLU) pipeline). The output of the NLP pipeline 112 are used by the server 106 to select: (1) a next one of the responses 113 that the software agent 116 provides the customer in the conversation 111 and (2) the cart updates 124 to update the cart 126.

The systems and techniques described herein provide a data-driven approach to the NLP pipeline 112. The conversation data 136 includes hundreds of thousands of conversations between a human customer and a human employee and is used to train a supervised machine learning model (e.g., the software agents 116) to make the responses 113 of the software agents 116 as human-like as possible. The conversation data 136 includes human-to-human conversations used to train a domain specific language model (e.g., the software agents 116). The systems and techniques described herein take advantage of newly available language models that provide a greater capacity for leveraging contextual information over the utterances 115 (e.g., a word, a phrase, a sentence, or multiple sentences including incomplete sentences).

Thus, an AI engine may be used to listen in on conversations between customers and human employees. The AI engine may automatically populate and modify a cart associated with an order that each customer is placing. The AI engine may automatically provide suggestions to the human employees on up-selling (e.g., adding items, increasing a size of ordered items, or both). The conversation data between customers and human employees may be stored to create a database of conversations associated with, for example, ordering food at a restaurant or another type of commerce site. The database of conversation data may be gathered over multiple months or years and used to train a machine learning algorithm, such as a software agent, to automatically take an order from a customer as if the customer was having a conversation with a restaurant employee. For example, given a conversation context and an utterance from the customer, the software agent determines and verbalizes (e.g., using text-to-speech) an appropriate and automated response using a natural language processing pipeline.

Figure 2:
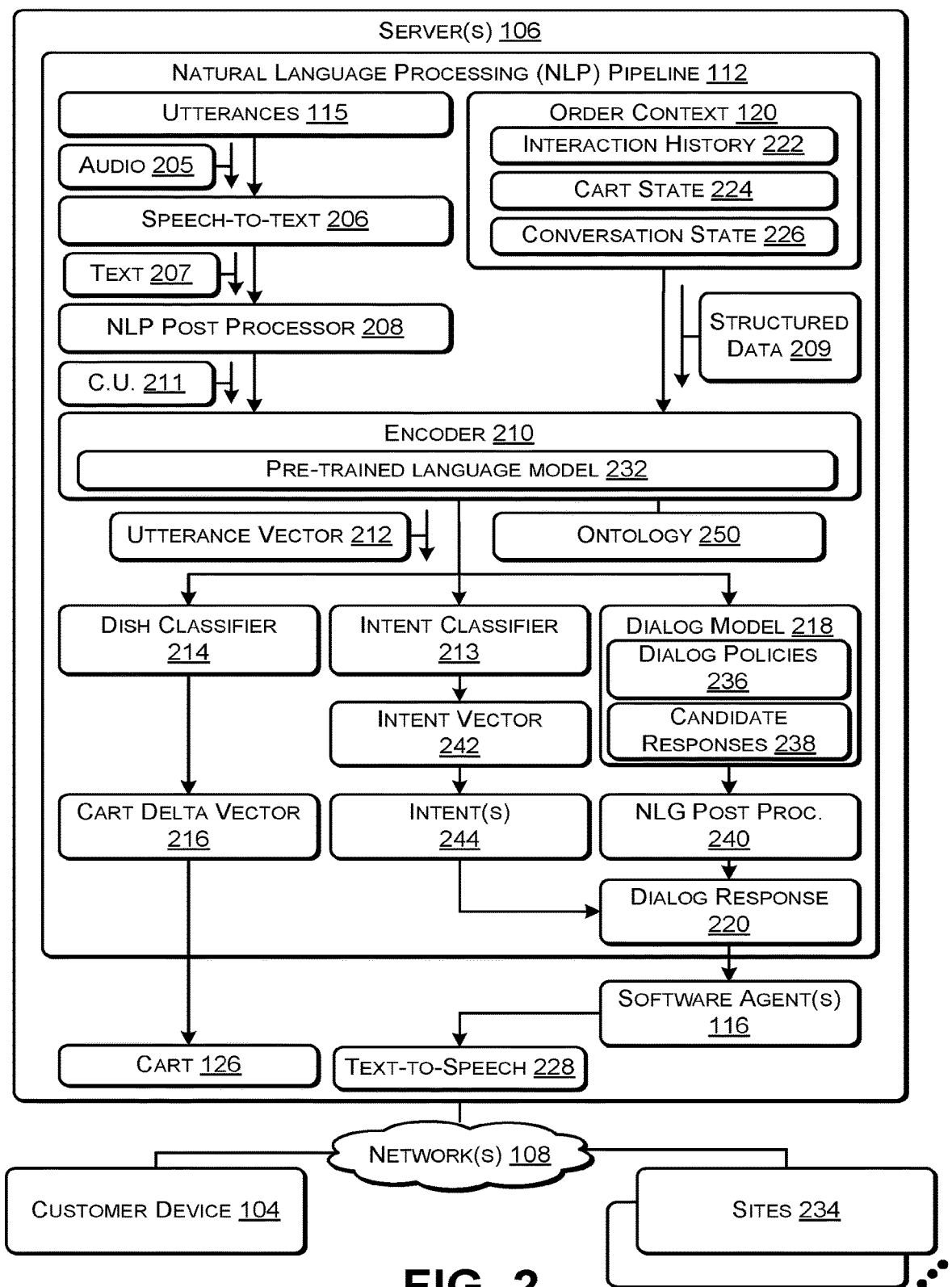
FIG. 2 is a block diagram of a natural language processing (NLP) pipeline, according to some embodiments.

FIG. 2 is a block diagram 200 of the natural language processing (NLP) pipeline 112 of FIG. 1, according to some embodiments. The NLP pipeline 112 may receive the utterances 115 of a customer (e.g., from the customer device 104 of FIG. 1). The NLP pipeline 112 may process audio data 205 that includes at least a portion of the utterances 115 using a speech-to-text converter 206 to convert the audio data 205 to text 207. For example, the utterances 115 may be "I would like 2 large pizzas with pepperoni and mushrooms."

The order context 120 may include an interaction history 222 between the software agent 116 and the customer, a current cart state 224, and a conversation state 226. The interaction history 222 may include interactions between the customer and one of the software agents 116, including the utterances 115 of the customer and the responses 113 of the software agent 116. The cart state 224 identifies a state of the customer's cart including, for example, items in the cart, how many of each item is in the cart, a price associated with each item, a total price associated with the cart, whether payment has been received (e.g., whether the cart has been through check out), a most recent change (e.g., addition, subtraction, or modification) to one or more items in the cart, other cart related information, or any combination thereof. The conversation state 226 may indicate a state of the conversation between the customer and the software agent 116, such as whether the conversation is in progress or has concluded, whether the customer is asked a question and is waiting for a response from the software agent 116, whether the software agent 116 has asked a question and is waiting for a response from the customer, a most recent utterance from the customer, a most recent response from the software agent 116, other conversation related information, or any combination thereof.

The utterances 115 are provided by a customer that has called the restaurant 132 of FIG. 1 to place an order. The utterances 115 are in the form of the audio data 205. The speech-to-text converter 206 converts the audio 205 into text 207. The text 207 is processed using an NLP post processor 208 that makes corrections, if applicable, to the text 207 to create corrected utterances 211. For example, the text 207 may include an incorrect word that is plausible in the context and multiple similar sounding words may be equally plausible. The NLP post processor 208 may make corrections by identifying and correcting one or more incorrect words in the text 207 to create corrected utterances 211. After the NLP post processor 208 processes the text 207, the corrected utterances 211 are sent to the encoder 210.

The order context 120, including the interaction history 222, the cart state 224, and the conversation state 226, are provided to the encoder 210 in the form of structured data 209. The structured data 209 includes defined data types that enable the structured data 209 to be easily searched. Unstructured data is raw text, such as "two pizzas with sausage and pepperoni". Structured data may use a structured language, such as JavaScript Object Notation (JSON), Structured Query Language (SQL), or the like to represent the data. For example, "two pizzas with sausage and pepperoni" may be represented using structured data as: {"Quantity": 2, "Item": "Pizza", "Modifiers": ["Pepperoni", "Sausage" ] }. In structured data 209, each data item has an identifier or some fixed structured meaning and is not subject to natural language meaning or interpretation. The order context 120 captures where the customer and the software agent 116 are in the conversation 111 (e.g., what has already been said), what items are in the cart 126, and the like.

The encoder 210 of the NLP pipeline 112 receives the text 207 (in the form of the corrected utterances 211) and the structured data 209 as input and predicts an utterance vector 212. For example, the encoder 210 may use word2vec, a two-layer neural net, to process the text 207 to create the utterance vector 212. The input to the NLP pipeline 112 is a text corpus and the output is a set of vectors, e.g., feature vectors that represent words in that corpus. The encoder 210 thus converts the text 207 into a numerical form that deep neural networks can understand. The encoder 210 looks for transitional probabilities between states, e.g., the likelihood that two states will co-occur. The NLP pipeline 112 groups vectors of similar words together in vector space to identify similarities mathematically. The vectors are distributed numerical representations of features, such as menu items. Given enough data, usage, and contexts during training, the encoder 210 is able to make highly accurate predictions about a word's meaning based on past appearances. The predictions can be used to establish the word's association with other words (e.g., "man" is to "boy" what "woman" is to "girl"), or cluster utterances and classify them by topic. The clusters may form the basis of search, sentiment analysis, and recommendations. The output of the encoder 210 is a vocabulary in which each item has a vector attached to it, which can be fed into a deep-learning net or simply queried to detect relationships between words. For example, by using cosine as a similarity measure, no similarity is expressed as a 90 degree angle, while total similarity is a 0 degree angle, complete overlap.

The encoder 210 may include a pre-trained language model 232 that predicts, based on the most recent utterances 115 and the current order context 120, (1) how the cart 126 is to be modified and (2) what the software agent 116 provides as a response, e.g., dialog response 220. The encoder 210 is a type of machine learning model for NLP that is a model pre-trained directly from a domain specific corpora. In some cases, the encoder 210 may use a Bidirectional Encoder Representations from Transformers (BERT), e.g., a transformer-based machine learning technique for natural language processing (NLP), to predict the utterance vector 212. The encoder 210 may be a language model 232 that converts the text 207 of the utterances into a vector of numbers. The language model 232 may be fine-tuned to a specific domain, e.g., to ordering at a restaurant and that too, at a specific type of restaurant (e.g., pizza, wings, tacos, etc.). The training is based on the conversation data 136 that has been gathered over time between customers and employees who enter data in the EA-POS 102. The employee entered data may be used as labels for the conversation data 136 when training the various machine learning models described herein. The language model 232 associates a specific utterance, e.g., "I want chicken wings", with a specific action, e.g., entering a chicken wing order into the EA-POS 102. The language model 232 predicts what items from the menu 140 are to be added to the cart 126 (e.g., based on one or more actions associated with the utterance 115) and which items are to be removed from the cart 126, quantities, modifiers, or other special treatments (e.g., preparation instructions such as "rare", "medium", "well done" or the like for cooking meat) associated with the items that are to be added and/or removed. In some aspects, the encoder 210 may be implemented as a multi-label classifier. Modifiers may include, for example, half pepperoni, half sausage, double cheese, and the like. In some cases, the language model 232 may be structured hierarchically, e.g., with pizza at a high level and modifiers at a lower level. Alternately, the language model 232 may use a flat system with every possible combination as a unique item.

The utterance vector 212 may be used by three classifiers (e.g., a type of machine learning algorithm, such as a support vector machine or the like), including the dish classifier, the intent classifier 213, and the dialog model 218. For example, the utterance vector 212 may be used by the dish classifier 214 to predict a multiclass cart delta vector 216. The multiclass cart delta vector 216 is used to modify the cart 126. For example, in the cart delta vector 216, the first position may indicate a size of the pizza, e.g., 1=small, 2=medium, 3=large, the second position may indicate a type of sauce, e.g., 0=no sauce, 1=1st type of sauce, 2=2nd type of sauce, the third position may indicate an amount of cheese, e.g., 0=no cheese, 1=normal cheese, 2=extra cheese, 3=double cheese, and the remaining positions may indicate the presence (e.g., 1) or the absence (e.g., 0) of various toppings, e.g., pepperoni, mushrooms, onions, sausage, bacon, olives, green peppers, pineapple, and hot peppers. Thus, (3, 1, 1, 1, 0, 0, 0, 0, 0, 0, 0, 0) is a vector representation of a large pizza with the first type of sauce, a normal amount of cheese, and pepperoni. If the utterances 115 includes "I'd like double cheese", then the vector representation may change to (3, 1, 3, 1, 0, 0, 0, 0, 0, 0, 0, 0), resulting in a corresponding change to the cart 126. Of course, this is merely an example and other vector representations may be created based on the number of options the restaurant offers for pizza size, types of sauces, amount of cheese, toppings, and the like.

The encoder 210 outputs the utterance vector 212 which a dialog model 218 uses to determine a predicted dialog response 220. For example, based on the order context 120 and the most recent utterances 115, the encoder 210 may determine the predicted response 220. The predicted response 220 is a prediction as to what a human employee would say at that point in the conversation (e.g., order context 120) based on the customer's most recent utterances 115. The encoder 210 is trained using the conversation data 136 to predict the dialog response 220 based on the utterances 115 and the order context 120. The software agent 116 converts the predicted dialog response 220 to speech using a text-to-speech converter 228. The dialog model may use dialog policies 236, candidate responses 238, and the order context 120 to predict the dialog response 220. For example, if a customer states that they would like to order a burger, an appropriate response may be "what toppings would you like on that burger?" In some cases, a natural language generation (NLG) post processor 240 may modify the output of the dialog model 218 to create the dialog response 220. For example, the NLG post processor 240 may modify the dialog response 220 to include local colloquialisms, more informal and less formal dialog, and the like. The NLG response is the translation of the dialog response 220 into natural language. The example is above.

Figure 5:
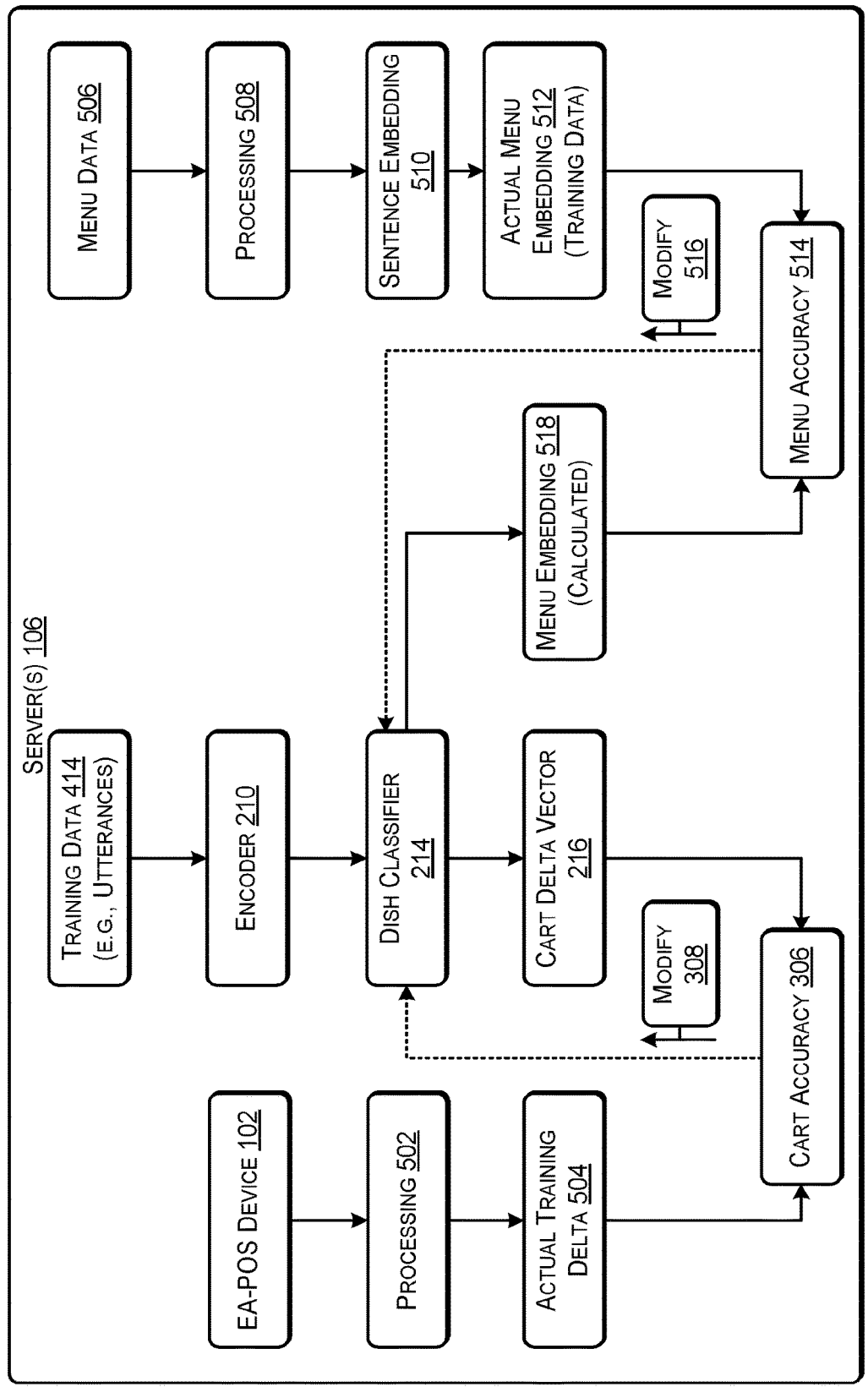
FIG. 5 is a block diagram to create a menu embedding used in a natural language processing (NLP) pipeline, according to some embodiments.

During training of the machine learning model used to create the software agents 116, the human-to-human conversations in the conversation data 136 of FIG. 1 are labelled to fine tune the language model 232, as described in more detail in FIG. 5. The utterances 115 and the order context 120 (e.g., contextual language information and current cart information up to a given point time) are encoded (e.g., into the utterance vector 212) to provide the cart delta vector 216 (e.g., a delta relative to the cart 126) as well as the next predicted dialog response 220. The cart delta vector 216 identifies the steps to update the cart 126. The codified delta over the cart indicates the steps to update the cart 126 and is the label that the human operator creates when handling the conversation that afterwards becomes the training dataset. For example, the encoder 210 is able to associate a specific utterance of the utterances 115, such as "I want chicken wings", with a specific action, e.g., entering a chicken wing order into the cart 126. The encoder 210 predicts what items should be added to the cart 126 (e.g., based on the action associated with the utterance) and which items should be removed from the cart 126, and any associated quantities. In some aspects, the encoder 210 may use a multi-label classifier, such as for example, decision trees, k-nearest neighbors, neural networks, or the like. In a multi-label classifier, modifiers may include, for example, half-pepperoni, half-sausage, double cheese, and the like. In some cases, the order may use hierarchical structures, with each particular type of order, such as pizza, wings, taco, or the like, at a highest level and modifiers at a lower level in the hierarchy. For example, pizza may be at the highest level while half-pepperoni, half-sausage, double cheese, and the like may be at a lower level. In other cases, the order may use a flat system with every possible combination as a unique item. For example, (a) half-pepperoni may be a first item, (b) half-sausage may be a second item, (c) double cheese may be a third item, (d) half-pepperoni and half-sausage may be a fourth item, (e) half-pepperoni, half-sausage, and double cheese may be a fifth item, and so on.

The intent classifier 213 takes the utterance vector 212 as input and creates an intent vector 242 that represents intent(s) 244 of the utterances 115. Thus, the intent classifier 213 creates the intent vector 242 that is a representation of the customer's intent in the utterances 115. The intent vector 242, along with the utterance vector 212, is used by the dialog model 218 to determine the dialog response 220. The dialog model 218 uses the utterance vector 212 and the intents 244 to create the dialog response 220. The dialog model 218 predicts the dialog response 220, the response that the software agent 116 to the utterance 115. In contrast, in a conventional voice-response system, the system uses a finite state machine. For example, in a conventional system, after each utterance, the system may ask for a confirmation "Did you say 'combo meal'? In the system of FIG. 2, a predictive model predicts the dialog response 220 based on the utterance 115 and the order context 120.

The dish classifier 214 predicts which items from the menu 140 the customer is ordering and modifies the cart 126 accordingly. For example, in the utterance "Can I have 2 pizzas with pepperoni, 6 chicken wings, but no salad", the dish classifier 214 determines which parts of this utterance refers to pizza. The dish classifier 214 model understands the history, e.g., there is a salad already in the cart (e.g., because it is included with chicken wings), and predicts the cart delta vector 216 to reflect how many pizzas and how many wings are there in the cart 126. The prediction of the dish classifier 214 indicates what is being added to and what is being deleted from the cart 126. Thus, based on the utterances 115 and the order context 120, the NLP pipeline 112 predicts the cart 126 and the dialog response 220. One or more of the classifiers 213, 214, 218 may use multiclass classification, a type of support vector machine. The intent classifier 213 determines intent(s) 244 of the utterances 115, e.g., is the intent 244 a menu-related question (e.g., "What toppings are on a Supreme pizza?" or a modification ("I'd link a large pepperoni pizza") to the cart 126.

In some aspects, the menu 140 of the restaurant 132 of FIG. 1 may be represented as an ontology 250 (e.g., a set of menu items in the menu 140 that shows each menu item's properties and the relationships between menu items). In some aspects, the ontology 250 may be represented in the form of a vector. e.g., each type of pizza may have a corresponding vector representation. In some aspects, the menu representations may be generated from unlabeled data, to enable the NLP pipeline 112 to handle any type of information related to ordering, dishes, and food items.

The utterances 115 are used as input to the NLP pipeline 112. The utterances 115 may be in the form of a concatenated string of a set of previous utterances. The amount of utterances 115 provided to the NLP pipeline 112 may be based on how much latent knowledge of the conversation state 226 is desired to be maintained. The greater the amount of utterances 115, the better the conversation state 226. The utterances 115 may be a word, a phrase, a sentence, or multiple sentences (including incomplete sentences) that the customer provides to the software agent 116 at each turn in the conversation. For example, an example conversation may include:

<agent>"Welcome to XYZ, how can I help you?"
<customer>"I'd like to order a large pepperoni pizza."
<agent>"Sure, one pepperoni pizza. We have a promotion going on right now where you can get an extra large for just two dollars more. Would you be interested in getting an extra large?"
<customer>"Okay, give me an extra large pepperoni."
<agent>"Would you like anything to drink?"
<customer>"Two bottles of water please."
<agent>"Anything else I can get for you? Dessert perhaps?"
<customer>"No. That will do it."
<agent>"Did you want this delivered or will you be picking up?"
<customer>"Pickup."
<agent>"Okay. Your total is $20.12. Our address for pickup is 123 Main Street. How would you like to pay?"
<customer>"Here is my credit card information <info>."
<agent? "Thanks. Your order will be ready in 20 minutes at 123 Main Street."

In this conversation, the customer may be calling from home, may be at a drive-through, or may be talking to an automated (e.g., unmanned) kiosk in the restaurant. There are a total of 6 turns in this example conversation, starting with "I'd like to order a large pepperoni pizza", with each turn including the customer's utterances 115 and the agent's response 220. The utterances 115 may thus include multiple sentences. In some aspects, chunking splitting may be performed, resulting in more than one representation corresponding to a unique utterance from the user. In some cases, the audio of the utterances 115 may be used as input, providing complementary features for emotion recognition, estimation of willingness to talk to AI, or for tackling issues as sidebar conversations. The satisfaction estimation based on vocal features also serves as a signal for optimizing the dialog policy.

The interaction history 222 includes contextual language information, such as, for example, the N previous utterances of the customer (N>0), the M previous responses from the software agent 116 (M>0). The cart state 224 includes current cart information. In some cases, a domain specific ontology 250 may be added as semantic representation of items in the knowledge base (e.g., the conversation data 136). The ontology 250 allows the encoder 210 to identify specific entities with which to select the correct modification to operate on the cart 126. The ontology 250 may be used to facilitate the onboarding of new items or whole semantic fields, alleviate the need for annotated data for each label (e.g., the entries of the employee into the EA-POS 102), and improve the performance of the NLP pipeline 112.

The encoder 210 creates the cart delta vector 216 that includes corresponding actions to update the cart 126 based on the most recent (e.g., latest turn) of the utterances 115. The cart delta vector 216 may be a vector, e.g., a sparse array of numbers that corresponds to a state difference. For example, for a cart that includes "Large Pepperoni Pizza", "2 Liter Coke" and "Chicken Salad", if the most recent utterance is "A large coke, but remove the salad", then the encoder 210 may output [0, 1, −1]. In this way, both the quantity and the intent to remove are encompassed.

The encoder 210 determines the utterance vector 212, a numerical representation of each input (e.g., the utterances 115 and the order context 120) based on the language model 232. The utterance vector 212 is a type of encoding, e.g., a set of symbols that represent a particular entity. For example, in some aspects, the encoding may be an array of real numbers, a vector (or a higher dimensional extension, such as a tensor), that is generated by a statistical language model from a large corpus of data. In addition to using the conversation data 136, the encoder 210 may leverage an additional corpus of data on multiple sites 234 (e.g., Wikipedia and the like), such as food-related sites, thereby enabling the encoder 210 to engage in specialized conversations, such as food-related conversations. In some cases, the encoder 210 may be trained to engage in conversations associated with a particular type of restaurant, e.g., a pizza restaurant, a chicken wings restaurant, a Mexican restaurant, an Italian restaurant, an Indian restaurant, a Middle Eastern restaurant, or the like.

The dish classifier 214 may predict the cart delta vector 216 by passing the encoded representations in the utterance vector 212 through additional neural dialog layers for classification, resulting in a sparse vector that indicates the corresponding element(s) within all possible cart actions, e.g., a comprehensive array of labels of possible combinations. The classifiers 213, 214, 218 may be trained using the conversation data 136. The ontology 250 provides information to precise the modifiers, relating cart actions that are highly related such as adding two different variations of the same dish.

The utterances 115 (e.g., representations of the conversation 111 of FIG. 1), along with the order context 120, may be used as the input to the encoder 210 to determine a particular one of the dialog policies 236 to select the next predicted response 220 of the software agent 116. Each particular one of the dialog policies 236 may be used to predict an appropriate response 220 from multiple candidate responses 238. In some cases, the dialog model 218 may use policy optimization with features such as emotion recognition, total conversation duration, or naturalness terms. The dialog response 220 may be fed back to the dialog model 218 as contextual information. In some cases, multitask learning algorithms that combine more than one similar task to achieve better results may be used with the encoder 210 to enable the encoder 210 to learn important aspects of language modeling that serve indirectly to the final downstream task, while allowing a controlled training process via the design of the learning curriculum. The multiple and auxiliary objective functions serve to leverage more error signals during training, and make the model learn proper representations of the elements involved. Semantic and structural information about the menu 140 is encoded into the ontology 250 and used to inform the later layers of the cart prediction system (e.g., dish classifier 214).

In some cases, curriculum learning may be used to design the order with which tasks of different types or complexity are fed to the encoder 210, the dish classifier 214, the intent classifier 213, the dialog model 218, or any combination thereof, to assist tackling different tasks or to perform prolonged training. In addition, to improve extended training processes, the systems and techniques described here may use continual learning, in which the encoder 210, the dish classifier 214, the intent classifier 213, the dialog model 218, or any combination thereof, are retrained as new conversation data is accumulated. In some cases, the continual learning may be performed with elastic weight consolidation to modulate optimization parameters. For example, continual learning along with incremental learning may be used for new classes, e.g., new dishes, sequentially adding them to the objective though training the same model. Curriculum learning is the process of ordering the training data and tasks using logic to increase the improvement on the later, objective tasks. For example, the first training may include auto-regressive loss, then sentence classification, and then a more complex task. In this way, the model may be incrementally improved instead of tackling directly a possibly too complex task. One or more of the machine learning models (e.g., 210, 213, 214, 218) in the NLP pipeline 112 may be re-trained using newly gathered conversation data 136. For example, the retraining may be performed to improve an accuracy of the machine learning models, to train the models for additional products (e.g., a pizza restaurant adds chicken wings) or additional services (e.g., a pandemic causes the introduction of curbside service as a variation of takeout). The retraining may be performed periodically (to improve accuracy) or in response to the introduction of a new product or a new service.

Figure 3:
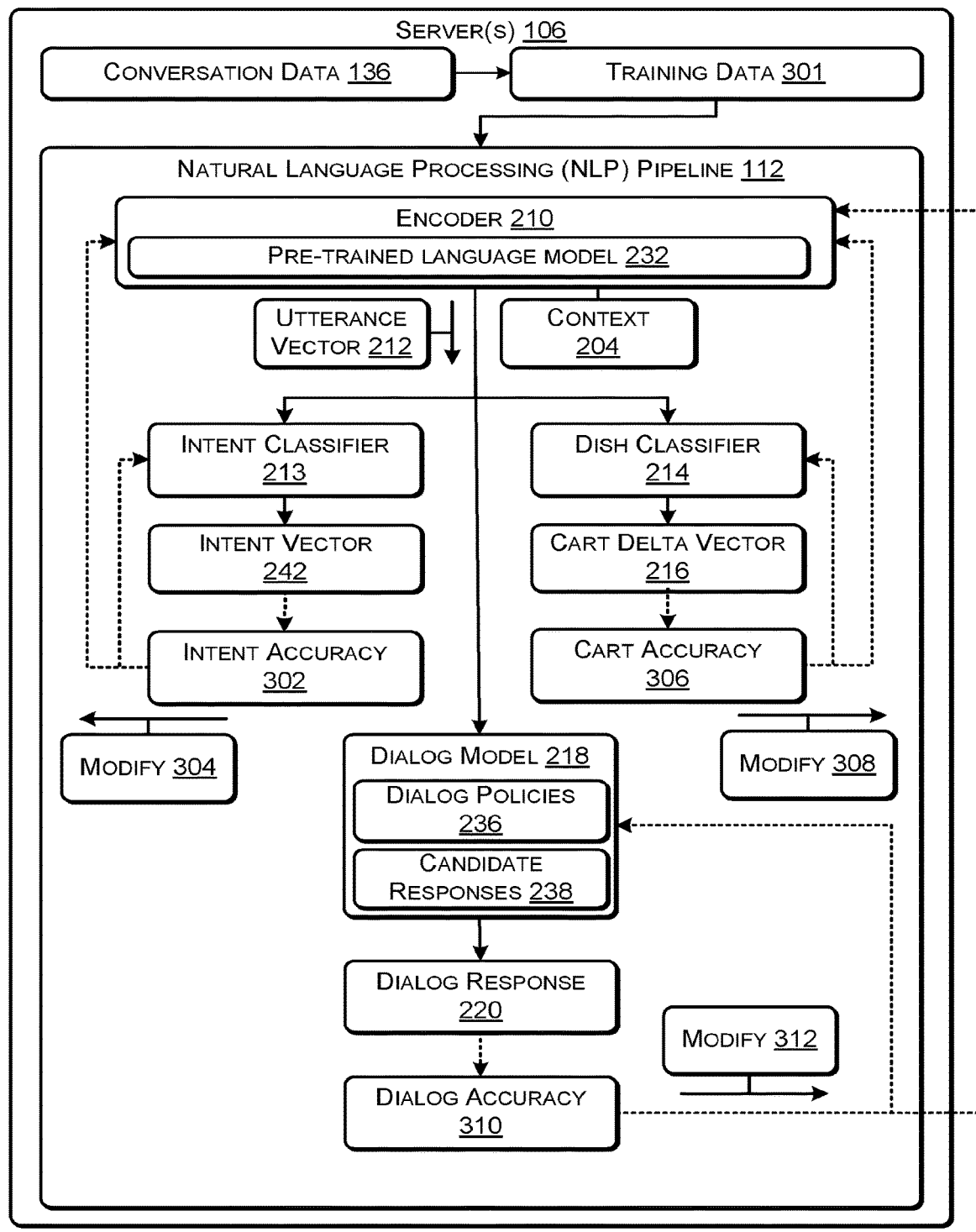
FIG. 3 is a block diagram illustrating training multiple classifiers used in a natural language processing (NLP) pipeline, according to some embodiments.
Figure 4:
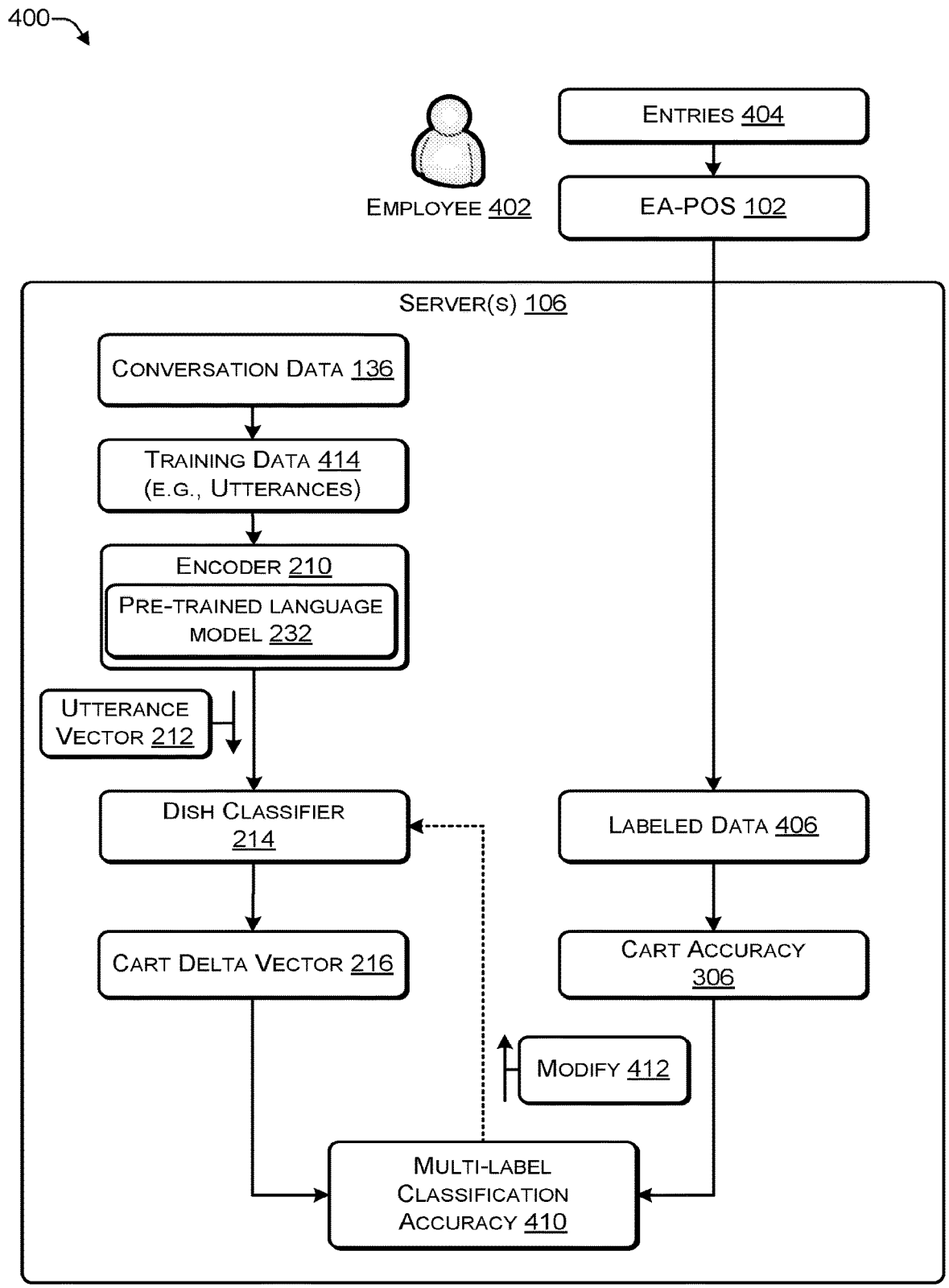
FIG. 4 is a block diagram illustrating training a dish classifier, according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400 and 500 are described with reference to FIGS. 1 and 2 as described above, although other models, frameworks, systems and environments may be used to implement this process.

FIG. 3 is a block diagram 300 illustrating training multiple classifiers used in a natural language processing (NLP) pipeline, according to some embodiments. FIG. 3 illustrates training the encoder 210, the intent classifier 213, the dish classifier 214, and the dialog model 218. A portion of the conversation data 136 may be selected as training data 301 and used as input into the natural language pipeline 112. The encoder 210 may create the utterance vector 212 based on the training data 301.

The intent classifier 213 may create the intent vector 242 based on the utterance vector 212 and the order context 120. The server 106 may determine an intent accuracy 302 of the intent vector 242 by comparing the intent vector 242 with the intent as in the conversation data 136. For example, the intent vector 242 may be compared with the employee's entry into the EA-POS 132 during the conversation included in the training data 301 to determine the intent accuracy 302 of the intent vector 242. If the intent accuracy 302 is less than a desired accuracy (e.g., 90%, 95%, 98% or the like), then an algorithm of the encoder 210 (e.g., to improve the utterance vector 212), of the intent classifier 213, or both may be modified at 304 to improve the intent accuracy 302. The process may be repeated until the intent accuracy 302 satisfies the desired accuracy.

The dish classifier 214 may create the cart delta vector 216 based on the utterance vector 212 and the order context 120. The server 106 may determine a cart accuracy 306 of the cart delta vector 216 by comparing the cart delta vector 242 with the cart associated with the conversation data 136. If the cart accuracy 306 is less than a desired accuracy (e.g., 90%, 95%, 98% or the like), then an algorithm of the encoder 210 (e.g., to improve the utterance vector 212), of the dish classifier 214, or both may be modified at 308 to improve the cart accuracy 306. The process may be repeated until the cart accuracy 306 satisfies the desired accuracy.

The dialog model 218 may predict, using machine learning, the dialog response 220 based on the utterance vector 212 and the order context 120. The server 106 may determine a dialog accuracy 310 of the dialog response 220 by comparing the dialog response 220 with the response of the human employee recorded in the conversation data 136. If the dialog accuracy 310 is less than a desired accuracy (e.g., 90%, 95%, 98% or the like), then an algorithm of the encoder 210 (e.g., to improve the utterance vector 212), of the dialog model 218, or both may be modified at 312 to improve the dialog accuracy 310. The process may be repeated until the dialog accuracy 310 satisfies the desired accuracy.

FIG. 4 is a block diagram 400 illustrating training a dish classifier, according to some embodiments. In FIG. 4, when talking to a customer while taking an order, the employee 402 may make one or more entries 404 into the EA-POS 102. The entries 404 may include the customer's utterances, the employee's responses, what the employee 402 enters into the EA-POS 102, or any combination thereof, with the entries 404 for being used as labels to create labeled data 406. For example, if the user utters "two pepperoni pizzas" and the employee 402 responds by entering two pepperoni pizzas into the EA-POS 102 (e.g., adding the pizzas to the customer's cart) than the utterance and the resulting cart may be labeled based on the entry of two pepperoni pizzas. The server 106 may determine the cart accuracy 306 of the labeled data 406.

A portion of the conversation data 136 may be used to create training data 414 that includes utterances of a customer. The training data 414 may be used as input to the encoder 210 to create the utterance vector 212. The dish vector 214 may create the cart delta vector 216. The cart delta vector 216 and the cart accuracy 306 may be used to determine an accuracy of multi-label classification 410. If the accuracy of the multi-label classification 410 does not satisfy a desired accuracy (e.g., 90%, 95%, 98% or the like), then the dish classifier 214 may be modified 412 to improve an accuracy of the dish classifier 214. This process may be repeated until the multi-label classification accuracy 410 satisfies the desired accuracy.

FIG. 5 is a block diagram 500 to create a menu embedding used in a natural language processing (NLP) pipeline, according to some embodiments. Transactions from the EA-POS device 102 are processed using processing 502 and compared with the cart delta vector 216 produced by the dish classifier 214 to determine an actual training delta 504. The actual training delta 504 is used to determine the cart accuracy 306. If the cart accuracy 306 does not satisfy a desired accuracy (e.g., 90%, 95%, 98% or the like), then the dish classifier 214 may be modified 308 to improve an accuracy of the dish classifier 214. This process may be repeated until the dish classifier 214 satisfies the desired accuracy.

In some cases, menu data 506 (associated with the menu 140) may be processed using processing 508 to determine, for example, sentence embedding 510. The sentence embedding 510 may be used to determine actual menu embedding 512. The actual menu embedding 512 may be compared with the predicted or calculated menu embedding 518 to determine a menu accuracy 514. If the menu accuracy 514 does not satisfy a desired accuracy (e.g., 90%, 95%, 98% or the like), then the dish classifier 214 may be modified 516 to improve an accuracy of the dish classifier 214. This process may be repeated until the dish classifier 214 satisfies the desired accuracy. The text processing may include concatenating a dish name, concatenating a description, concatenating ingredients, concatenating tags and the like. An example embedding includes an array of numbers and the encoding process may include matrix multiplication.

Figure 6:
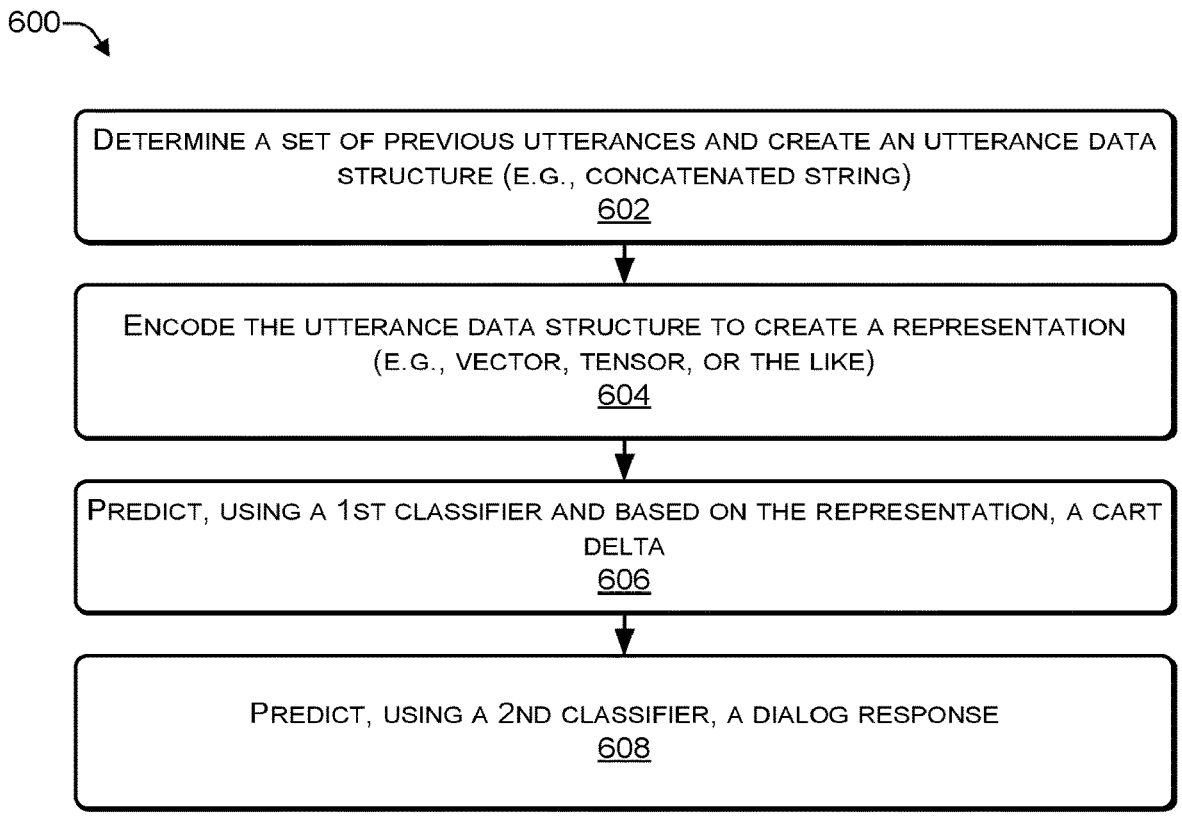
FIG. 6 is a flowchart of a process that includes predicting a dialog response using an artificial intelligence (AI) engine, according to some embodiments.
Figure 7:
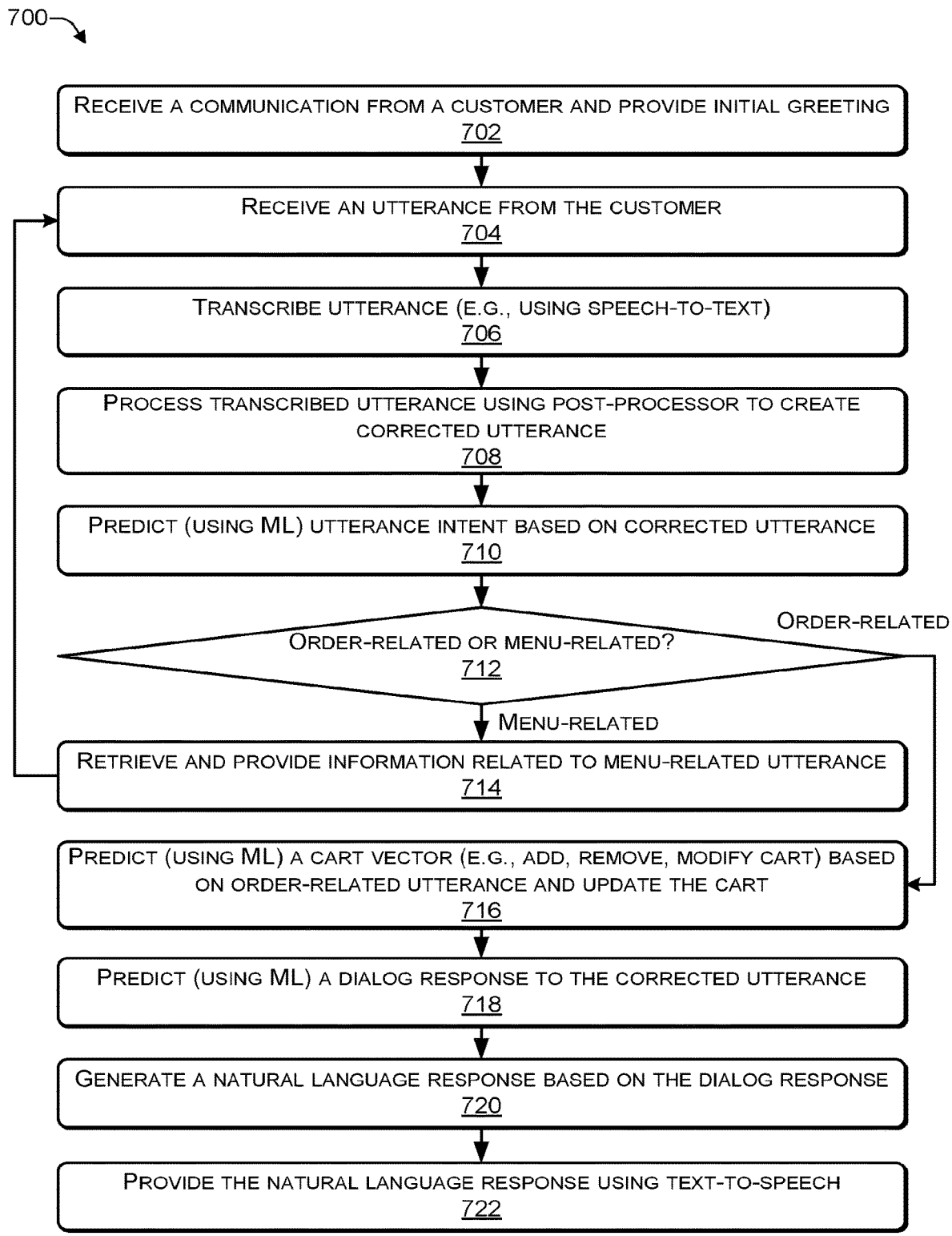
FIG. 7 is a flowchart of a process that includes predicting a cart vector, according to some embodiments.
Figure 8:
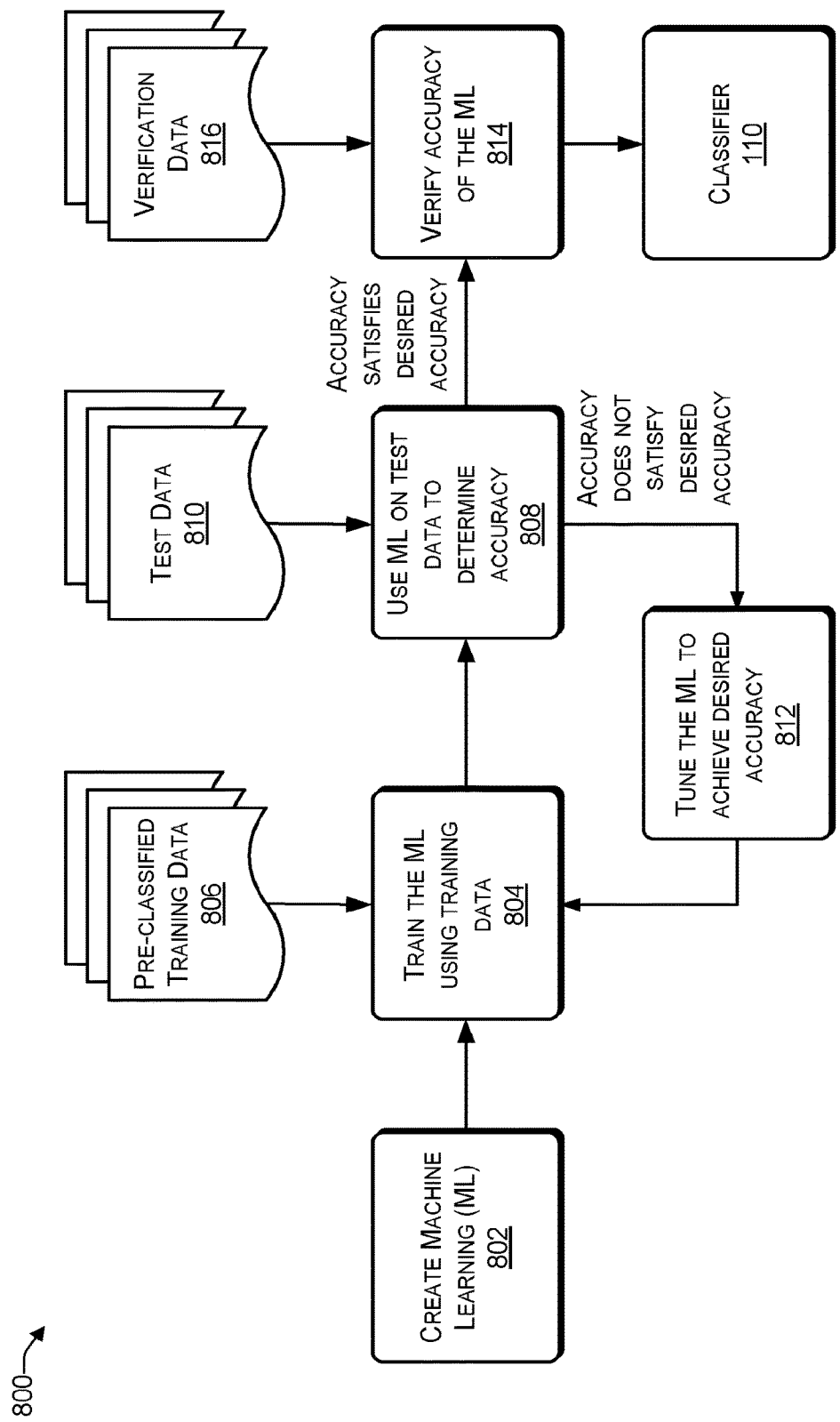
FIG. 8 is a flowchart of a process to train a machine learning algorithm to create a classifier, according to some embodiments.

In the flow diagrams of FIGS. 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700, and 800 are described with reference to FIGS. 1, 2, 3, 4, and 5 as described above, although other models, frameworks, systems and environments may implement these processes.

FIG. 6 is a flowchart of a process 600 that includes predicting a dialog response using an artificial intelligence (AI) engine, according to some embodiments. The process 600 may be performed by a server, such as the server 106 of FIGS. 1, 2, 3, 4, and 5.

At 602, the process determines a set of previous utterances (e.g., historical data) and create an utterance data structure (e.g., a concatenated string). At 604, the utterance data structure is encoded to create a data structure representation (e.g., a vector, a tensor, or the like). For example, in FIG. 2, the encoder 210, based on the order context 120, processes the text 207 of the utterances 115 to create the utterance vector 212.

At 606, a first classifier is used to predict, based on the representation, a cart delta. For example, in FIG. 2, the dish classifier 214, based on the order context 120 and the utterance vector 212, creates the cart delta vector 216.

At 608, a second classifier is used to predict a dialog response. For example, in FIG. 2, the dialog model 218, based on the order context 120 and the utterance vector 212, creates the dialog response 220.

FIG. 7 is a flowchart of a process 700 that includes predicting a cart vector, according to some embodiments. The process 700 may be performed by a server, such as the server 106 of FIGS. 1, 2, 3, 4, and 5.

At 702, the process receives a communication from a customer and provides an initial greeting. At 704, the process receives an utterance from the customer. At 706, the process transcribes the utterance (e.g., using speech to text). At 708, the transcribed utterances processed using a post processor to create a corrected utterance. For example, in FIG. 1, the customer initiates a communication (call, text, chat, or the like) using the customer device 104. In response to receiving the customer-initiated communication, one of the software agents 116 provides an initial greeting. The software agent 116 receives a first of the customer utterances 115. In FIG. 2, one or more of the utterances 115 are converted to the audio 205 and processed using the speech-to-text converter 206 to create the text 207. The NLP post processor 208 may be used to process the text 207 to create the corrected utterance 209.

At 710, a classifier is used to predict an utterance intent based on the corrected utterance. At 712, the process determines whether the utterance intent is order-related or menu-related. If the process determines that the utterance intent is menu-related, at 712, then the process retrieves and provides information related to the menu-related utterance, at 714, and goes back to 704 to receive an additional utterance from the customer. If the process determines that the utterance intent is order-related, at 712, then the process predicts a cart vector (e.g., that adds, removes, and/or modifies a cart) based on the order related utterance and updates the cart based on the cart vector. These are merely examples of 2 types of intents. Of course, there may be other intents. Thus, at 712, the process selects an appropriate class of action based on the intent classifier.

At 720, the process generates a natural language response based on the dialog response. At 722, the process provides a natural language response as speech using a text-to-speech converter. For example, in FIG. 2, the encoder 210 creates the utterance vector 212 which the dialog model 218 uses to create a natural language response in the form of the dialog response 220. The dialog response 220 is provided to the software agent 116 which converts it to speech using the text-to-speech converter 228.

FIG. 8 is a flowchart of a process 800 to train a machine learning algorithm to create a classifier, according to some embodiments. The process 700 may be performed by a server, such as the server 106 of FIGS. 1, 2, 3, 4, and 5, to train the encoder 210, the dish classifier 214, the intent classifier 213, and the dialog model 218.

At 802, the machine learning algorithm (e.g., software code) may be created by one or more software designers. At 804, the machine learning algorithm may be trained using training data 806 (e.g., a portion of the conversation data 136). For example, the training data 806 may be a representational set of data and self-supervised training by machine learning, or could have been pre-classified by humans, or a combination of both. After the machine learning has been trained using the training data 806, the machine learning may be tested, at 808, using test data 810 to determine an accuracy of the machine learning. For example, in the case of a classifier (e.g., support vector machine), the accuracy of the classification may be determined using the test data 810.

If an accuracy of the machine learning does not satisfy a desired accuracy (e.g., 95%, 98%, 99% accurate), at 808, then the machine learning code may be tuned, at 812, to achieve the desired accuracy. For example, at 812, the software designers may modify the machine learning software code to improve the accuracy of the machine learning algorithm. After the machine learning has been tuned, at 812, the machine learning may be retrained, at 804, using the pre-classified training data 806. In this way, 804, 808, 812 may be repeated until the machine learning is able to classify the test data 810 with the desired accuracy.

After determining, at 808, that an accuracy of the machine learning satisfies the desired accuracy, the process may proceed to 814, where verification data 816 (e.g., a portion of the conversation data 136 that has been pre-classified) may be used to verify an accuracy of the machine learning. After the accuracy of the machine learning is verified, at 814, the machine learning 130, which has been trained to provide a particular level of accuracy may be used.

The process 800 may be used to train each of multiple machine learning algorithms (e.g., classifiers) described herein, such as the encoder 210, the dish classifier 214, the intent classifier 213, and the dialog model 218.

Figure 9:
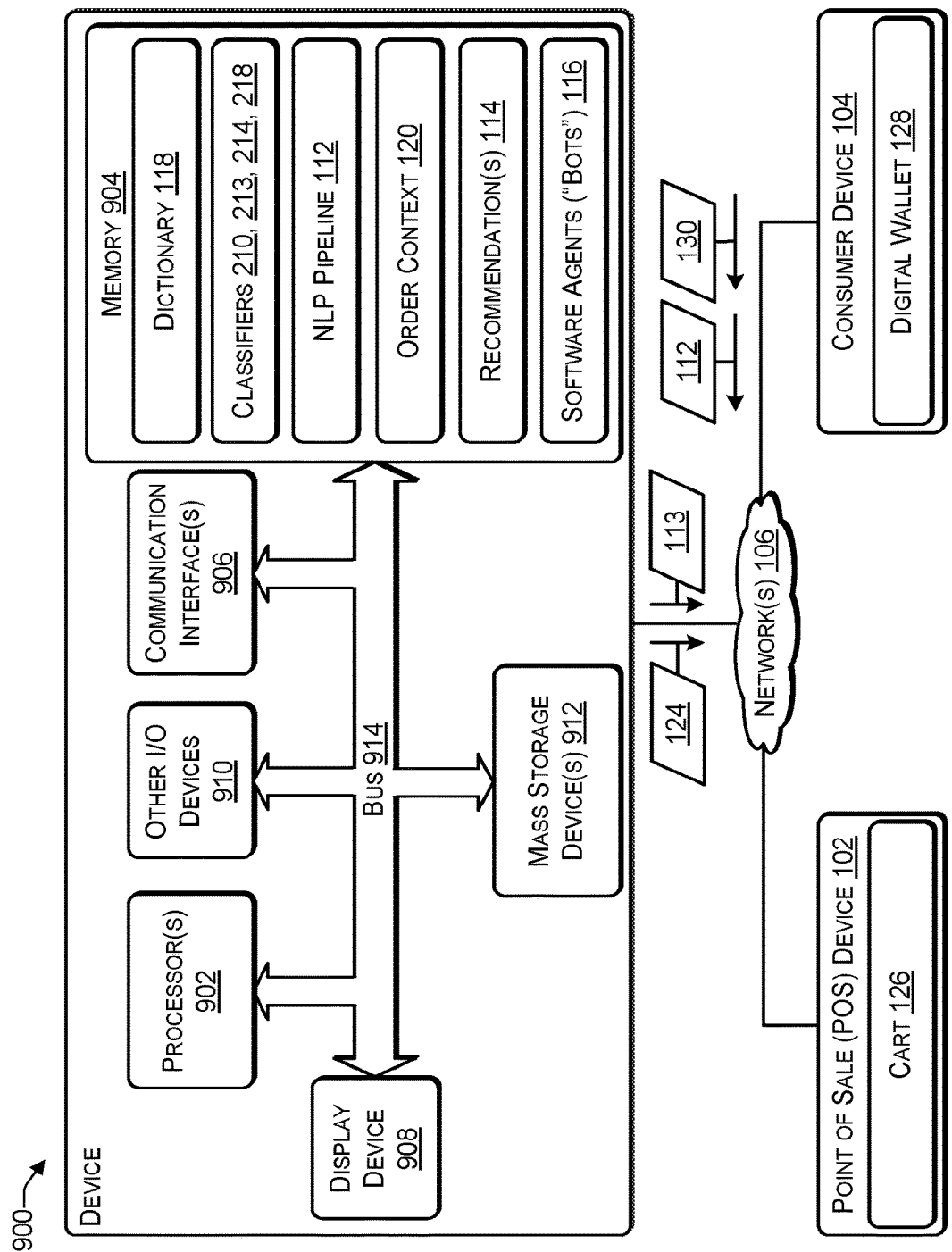
FIG. 9 illustrates an example configuration of a computing device that can be used to implement the systems and techniques described herein.

FIG. 9 illustrates an example configuration of a device 900 that can be used to implement the systems and techniques described herein, such as, for example, the computing devices 102, the consumer device 104, and/or the server 106 of FIG. 1. For illustration purposes, the device 900 is illustrated in FIG. 9 as implementing the server 106 of FIG. 1.

The device 900 may include one or more processors 902 (e.g., CPU, GPU, or the like), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 902 are one or more hardware devices that may include a single processing unit or a number of processing units, all of which may include single or multiple computing units or multiple cores. The processors 902 may include a graphics processing unit (GPU) that is integrated into the CPU or the GPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 may be configured to fetch and execute computer-readable instructions stored in the memory 904, mass storage devices 912, or other computer-readable media.

Memory 904 and mass storage devices 912 are examples of computer storage media (e.g., memory storage devices) for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein and may be any type of non-transitory media capable of storing computer-readable, processor-executable program instructions as computer program code that can be executed by the processors 902 as a particular machine configured for carrying out the operations and functions described in the implementations herein.

The device 900 may include one or more communication interfaces 906 for exchanging data via the network 110. The communication interfaces 906 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 116 and mass storage devices 912, may be used to store software and data, including, for example, the dictionary 118, the classifiers 210, 213, 214, 218, the NLP pipeline 112, the order context 120, the recommendations 114, and the software agents 116.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by a software agent executing on a server, a communication comprising a first utterance from a customer;
   predicting, using a first machine learning algorithm, a first intent of the first utterance;
   based on determining that the first intent is order-related, predicting, using a second machine learning algorithm, a cart delta vector based at least in part on the first utterance, the cart delta vector comprising a vector representation of a difference to be applied to a content of a cart;
   modifying the cart that is associated with an order of the customer based on applying the cart delta vector to the content of the cart;
   predicting, using a dialog model, a first dialog response based at least in part on the first utterance, a dialog policy, and an order context associated with the order; and
   providing the first dialog response, by the software agent, to the customer using a text-to-speech converter.

2. The method of claim 1, further comprising:
   receiving, by the software agent, a second utterance from the customer;
   predicting, using the first machine learning algorithm, a second intent of the second utterance;
   based on determining that the second intent is menu-related, retrieving menu-related information based at least in part on the second utterance;
   predicting, using the dialog model, a second dialog response based at least in part on the second utterance, the menu-related information, the dialog policy, and the order context; and
   providing the second dialog response to the customer using the text-to-speech converter.

3. The method of claim 1, wherein modifying the cart associated with the customer based on the cart delta vector comprises:
   adding a new item to the cart;
   deleting a current item from the cart;
   modifying an existing item in the cart; or
   any combination thereof.

4. The method of claim 1, wherein predicting, using the dialog model, the first dialog response based at least in part on the first utterance comprises:
   predicting the first dialog response based on a plurality of candidate responses and based on the dialog policy and the order context.

5. The method of claim 1, wherein the order context comprises:

an interaction history between the customer and the software agent;
a cart state of the cart associated with the customer; and
a conversation state of a conversation between the customer and the software agent, the conversation including the first utterance and the first dialog response.

6. The method of claim 1, further comprising:
receiving, by the software agent, a third utterance from the customer;
predicting, using the first machine learning algorithm, a third intent of the third utterance;
based on determining that the third intent is order-related, closing the cart;
receiving payment information from the customer; and
initiating order fulfillment of items in the cart.

7. The method of claim 1, wherein receiving, by the software agent executing on the server, the communication comprising the first utterance from the customer comprises:
receiving audio data that includes the first utterance;
converting the audio data to text using a speech-to-text converter; and
performing post processing on the text to create a corrected utterance.

8. A server comprising:
one or more processors; and
one or more non-transitory computer readable media storing instructions executable by the one or more processors to perform operations comprising:
receiving, by a software agent executing on the server, a communication comprising a first utterance from a customer;
predicting, using a first machine learning algorithm, a first intent of the first utterance;
based on determining that the first intent is order-related, predicting, using a second machine learning algorithm, a cart delta vector based at least in part on the first utterance, the cart delta vector comprising a vector representation of a difference to be applied to a content of a cart;
modifying the cart that is associated with an order of the customer based on applying the cart delta vector to the content of the cart;
predicting, using a dialog model, a first dialog response based at least in part on the first utterance, a dialog policy, and an order context associated with the order; and
providing the first dialog response, by the software agent, to the customer using a text-to-speech converter.

9. The server of claim 8, wherein the operations further comprise:
receiving, by the software agent, a second utterance from the customer;
predicting, using the first machine learning algorithm, a second intent of the second utterance;
based on determining that the second intent is menu-related, retrieving menu-related information based at least in part on the second utterance;
predicting, using the dialog model, a second dialog response based at least in part on the second utterance, the menu-related information, the dialog policy, and the order context; and
providing the second dialog response to the customer using the text-to-speech converter.

10. The server of claim 8, wherein modifying the cart associated with the customer based on the cart delta vector comprises:

adding a new item to the cart;
deleting a current item from the cart;
modifying an existing item in the cart; or
any combination thereof.

11. The server of claim 10, wherein:
the new item, the current item, and the existing item correspond to menu items in a menu associated with a restaurant.

12. The server of claim 8, wherein predicting, using the dialog model, the first dialog response based at least in part on the first utterance comprises:
predicting the first dialog response from a plurality of candidate responses based on the dialog policy and the order context.

13. The server of claim 8, wherein the order context comprises:
an interaction history between the customer and the software agent;
a cart state of the cart associated with the customer; and
a conversation state of a conversation between the customer and the software agent, the conversation including the first utterance and the first dialog response.

14. The server of claim 8, wherein the operations further comprise:
receiving, by the software agent, a third utterance from the customer;
predicting, using the first machine learning algorithm, a third intent of the third utterance;
based on determining that the third intent is order-related, closing the cart;
receiving payment information from the customer; and
initiating order fulfillment of items in the cart.

15. A memory device to store instructions executable by one or more processors to perform operations comprising:
receiving, by a software agent executing on a server, a communication comprising a first utterance from a customer;
predicting, using a first machine learning algorithm, a first intent of the first utterance;
based on determining that the first intent is order-related, predicting, using a second machine learning algorithm, a cart delta vector based at least in part on the first utterance, the cart delta vector comprising a vector representation of a difference to be applied to a content of a cart;
modifying the cart that is associated with an order of the customer based on applying the cart delta vector to the content of the cart;
predicting, using a dialog model, a first dialog response based at least in part on the first utterance, a dialog policy, and an order context associated with the order; and
providing the first dialog response, by the software agent, to the customer using a text-to-speech converter.

16. The memory device of claim 15, wherein the operations further comprise:
receiving, by the software agent, a second utterance from the customer;
predicting, using the first machine learning algorithm, a second intent of the second utterance;
based on determining that the second intent is menu-related, retrieving menu-related information based at least in part on the second utterance;
predicting, using the dialog model, a second dialog response based at least in part on the second utterance, the menu-related information, the dialog policy, and the order context; and providing the second dialog response to the customer using the text-to-speech converter.

17. The memory device of claim 15, wherein modifying the cart associated with the customer based on the cart delta vector comprises:
adding a new item to the cart;
deleting a current item from the cart;
modifying an existing item in the cart; or
any combination thereof.

18. The memory device of claim 15 wherein predicting, using the dialog model, the first dialog response based at least in part on the first utterance comprises:
predicting the first dialog response based on a plurality of candidate responses and based on the dialog policy and the order context.

19. The memory device of claim 15, wherein the order context comprises:
an interaction history between the customer and the software agent;
a cart state of the cart associated with the customer; and
a conversation state of a conversation between the customer and the software agent, the conversation including the first utterance and the first dialog response.

20. The memory device of claim 15, wherein the operations further comprise:
receiving, by the software agent, a third utterance from the customer;
predicting, using the first machine learning algorithm, a third intent of the third utterance;
based on determining that the third intent is order-related, closing the cart;
receiving payment information from the customer; and
initiating order fulfillment of items in the cart.

* * * * *